C., L. & J. P. Griscom,

Steam Pump.

No. 4,204. Reissued Dec. 20. 1870.

Witnesses.

A. A. Yeatman

C. L. Ewert.

Inventor.

L. Griscom

L. Griscom

J. P. Griscom per Alexander Mason attys.

N. PETERS, PHOTO-LITHOGRAPHER, WASHINGTON, D. C.

United States Patent Office.

CHALKLEY GRISCOM, LEWIS GRISCOM, AND JOHN P. GRISCOM, OF MAHANOY PLANE, PENNSYLVANIA.

Letters Patent No. 95,222, dated September 28, 1869; reissue No, 4,204, dated December 20, 1870.

IMPROVEMENT IN PUMPS.

The Schedule referred to in these Letters Patent and making part of the same.

*To all whom it may concern:*

Be it known that we, CHALKLEY GRISCOM, LEWIS GRISCOM, and JOHN P. GRISCOM, of Mahanoy Plane, in the county of Schuylkill and State of Pennsylvania, have invented certain new and useful Improvements in Pumps; and do hereby declare the following to be a full, clear, and exact description thereof, reference being had to the accompanying drawing and to the letters of reference marked thereon.

The nature of our invention consists in the construction and arrangement of a pump, to be used for mining and other purposes; and Its object is to throw a continuous stream, and to keep the water at an uninterrupted flow, so that, when the column of water is once started it will continue to move so long as the pump is in motion.

In order to enable others skilled in the art to which our invention appertains to make and use the same we will now proceed to describe its construction and operation, referring to the annexed drawing which forms a part of this specification, and in which—

A B represent two steam-cylinders, arranged in a horizontal or other position, parallel to each other, or otherwise, as may be desired.

C D are two pump-cylinders, arranged respectively opposite to and in line with the cylinders A B.

Figure 3:
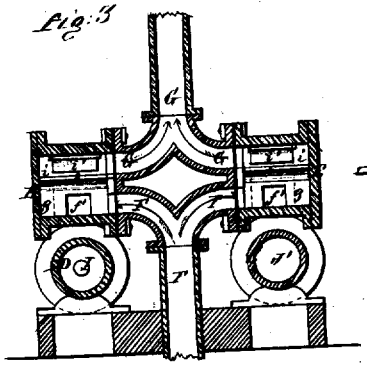
Figure 3 is an enlarged transverse vertical section of the same, taken on the plane of the line *x x*, fig. 2.

Upon each pump-cylinder is set a clack-chamber, E, and the clack-chambers of the two pumps are connected with each other by the branched suction-pipe F, and by the branched discharge-pipe G, as is clearly shown in fig. 3. It will be noticed that the partition which divides the upper end of the suction-pipe F has a point coming down in the center, and that the branches of said suction-pipe do not divide at right angles, but are curved; hence, there is very little if any resistance and loss of force, as the water drawn up through the pipe F strikes the point of the partition and is gradually turned off toward both sides into the clack-chambers. In like manner the branches, at the lower end of the discharge-pipe G, are curved, so that, when or at the point where the two streams unite, they have already been diverted to nearly the direction of said discharge-pipe.

H H′ are the piston-rods of the cylinders A B.

I I′ are the piston-rods of the pump-plungers J J that are moved back and forth in the cylinders C D.

Each piston-rod H is connected with its plunger-rod I by means of an upright cross-head, K, into opposite sides of which both rods H and I are screwed or otherwise rigidly fastened.

Figure 4:
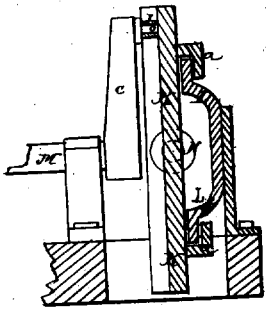
Figure 4 is a detail transverse vertical section of the same, taken on the plane of the line *y y*, fig. 2.
Figure 5:
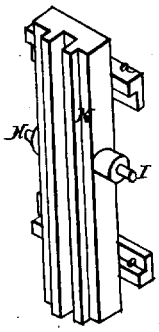
Figure 5 is an enlarged perspective view of the cross-head which connects the piston-rod with the plunger-rod.

These cross-heads have lips, *a a*, projecting from their outer sides, said lips fitting over or around the upper and lower edges of stationary guide-plates, L, that are arranged on the bed of the machine, as indicated in fig. 4.

The lips *a a* project, as mentioned, not only from the outer side of the cross-head, but also for a suitable distance on each side, that is, toward the engine and the cylinder, for a purpose that will be presently described.

Figure 1:
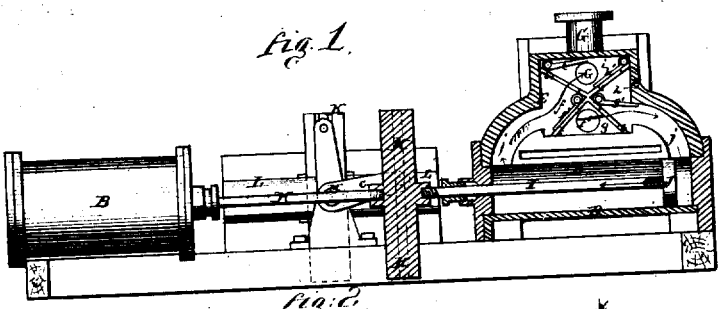
Figure 1 is a longitudinal vertical section of our improved pump.
Figure 2:
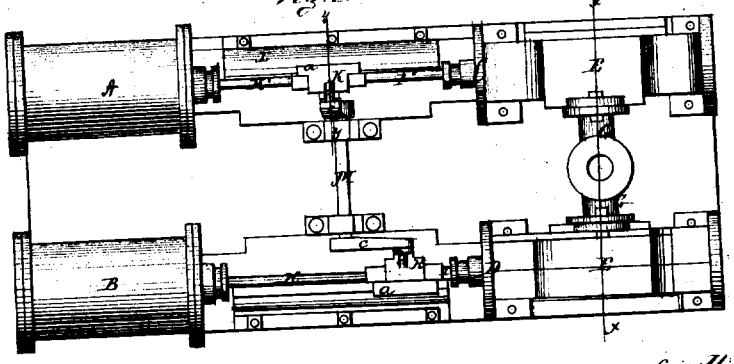
Figure 2 is a plan or top view of the same.

The inner faces of the cross-heads are grooved up and down, as in figs. 1 and 2.

Into these grooves fit the wrist-pins *b* of cranks *c*, formed on the opposite ends of a horizontal shaft, M.

As the piston-rods are drawn back and forth they impart direct motion to the pump-plungers, and, by means of the grooves in the cross-heads and by the wrist-pins, they also impart rotary motion to the shaft M.

The cross-heads K K, it will be noticed, are solid, and grooved only sufficiently deep to admit the wrist-pins *b b*. By this construction we obtain a vastly increased strength to resist the strain upon it, and, by the lips *a a*, projecting on both sides, they are firmly held to the stationary guide L, so as to slide on the same, but have no vibrating motion. When the wrist-pin is at either end of the cross-head the tendency would naturally be to tip the cross-head; but the lips being longer than the width of the cross-head, this tendency is entirely obviated and the cross-head is made to move with the utmost steadiness.

By means of this arrangement of the cross-heads K K the piston and pump-rods may be as short or as long as may be desired. For mining purposes this is very convenient, as the machine can be set up on a very contracted bed. Both engines may be employed to work one pump when so desired.

The cranks *c c* on the shaft M stand at right angles to each other, thereby forming an effectual device for overcoming the dead-point, as one engine is at the middle of its stroke whenever the other is at the end, and thus one engine always serves to overcome the dead-point of the other engine.

Another advantage of having the cranks arranged at right angles is to keep the column of water in constant motion, as when one pump-plunger is at the end of its stroke the other plunger will be at the middle of its stroke, and the column of water will, consequently, be in constant motion, each pump being double-acting.

To prevent friction on the wrist-pins *b b*, there are friction-rollers, *d d*, arranged around them, as shown in figs. 1 and 4.

Each of the clack-chambers E is, by means of two diagonal partitions, *e e*, divided into four compartments, *f*, *g*, *h*, and *i*, as shown in fig. 1.

The two compartments *f* and *h* are respectively connected, by means of channels, *j j*, with the ends of the pump-cylinder.

The compartments *g* and *i*, which are between *f* and *h*, as shown, communicate respectively with the suction and discharge-pipes.

The partitions *e e*, between the four compartments *f g h i*, are provided with four valves, *f'*, *g'*, *h'*, and *i'*, as shown in fig. 1, all of these valves opening upward.

The action of each part of our machine will now be easily understood.

If the plunger J moves in the direction of the arrow, shown in fig. 1, it draws the valve *g'* open by suction and draws the liquid from the suction or tail-pipe F into the chamber *g*, thence into *h*, and finally into the pump-cylinder.

The same suction serves to keep the valve *h'* on its seat. At the same time, the plunger will force the water in front of it into the chamber *f*, the water thus forced opening the valve *i'*, and escaping into the discharge or column-pipe G, the valve *f'* being closed.

From the position of the cranks *c c* on the shaft M, as above described, it is evident that, at the time when the plunger J is at the dead-point or end of the cylinder and commences its stroke, as indicated by the arrow, the other plunger, J', is at the middle of its stroke, and when the former plunger, J, has completed one-half of its stroke, or is at the center of its cylinder, then the plunger J' will just pass the dead-point and operate in the same manner.

When the motion of the plunger J is reversed, the water drawn in by the previous stroke will be forced out through the valve *h'*, while the suction will operate by opening the valve *f'*. When this movement of the plunger J commences, the other plunger, J', is at the middle of its stroke. Hence it will be seen that the force exerted upon the column of water is at all times the same under the same head of steam; because when the force of one plunger increases the other decreases, and *vice versa;* and when one plunger is at the height of its stroke the other is at the dead-point, and exerts, for an instant, no force at all.

In this manner the column of water is kept constantly moving up through the tail-pipe F, and its curved branches into the clack-chambers and cylinders, and from them through the curved branches into and out of the column-pipe G.

Having thus fully described our invention,

What we claim as new, and desire to secure by Letters Patent, is—

1. The cross-heads K, made solid, with vertical grooves on their inner faces, and with angular lips on their backs which extend beyond the sides of the cross-heads and over the edges of the stationary guides L, all arranged between the steam and pump-cylinders of a double-acting steam-pump, substantially as set forth.

2. The combination of the cross-heads K, constructed as described, the piston-rods H, plunger-rods I, stationary guides L, and the crank-shaft M, with its arms *c* placed at right angles; all operating as set forth.

3. The combination of the induction and eduction pipes F and G, each with two curved branches, forming a central cone, arranged between and acting with the two clack-chambers E E, having X-shaped partitions and valves, and the pump-cylinders C D, all substantially as and for the purposes herein set forth.

4. The combination and arrangement of the steam-cylinders A B, piston-rods H H', stationary guides L L, cross-heads K K, crank-shaft M, pump-cylinders C D, clack-chambers E E, and the suction and discharge-pipes F and G, all constructed to operate substantially as and for the purposes herein set forth.

In testimony that we claim the foregoing we have hereunto set our hands this 24th day of October, 1870.

CHALKLEY GRISCOM.
LEWIS GRISCOM.
JOHN P. GRISCOM.

Witnesses:
GEORGE W. DOWNING,
ROSS BULL.